United States Patent
Wang

(10) Patent No.: US 9,534,642 B2
(45) Date of Patent: Jan. 3, 2017

(54) OPPOSED IRON CORE, MANUFACTURING METHOD THEREOF, AND ELECTROMAGNETIC FAN CLUTCH USING OPPOSITE IRON CORE

(76) Inventor: Zhaoyu Wang, Longkou (CN)

( * ) Notice: Subject to any disclaimer, the term of this patent is extended or adjusted under 35 U.S.C. 154(b) by 0 days.

(21) Appl. No.: 14/389,731

(22) PCT Filed: Mar. 30, 2012

(86) PCT No.: PCT/CN2012/073308
§ 371 (c)(1),
(2), (4) Date: Sep. 30, 2014

(87) PCT Pub. No.: WO2013/143118
PCT Pub. Date: Oct. 3, 2013

(65) Prior Publication Data
US 2015/0060226 A1    Mar. 5, 2015

(51) Int. Cl.
| F16D 27/06 | (2006.01) |
| F16D 27/14 | (2006.01) |
| H01F 3/04 | (2006.01) |
| H01F 41/02 | (2006.01) |
| F16D 27/00 | (2006.01) |
| F16D 27/01 | (2006.01) |
| H01F 7/08 | (2006.01) |

(52) U.S. Cl.
CPC ............ *F16D 27/004* (2013.01); *F16D 27/01* (2013.01); *F16D 27/06* (2013.01); *F16D 27/14* (2013.01); *H01F 3/04* (2013.01); *H01F 7/081* (2013.01); *H01F 41/0213* (2013.01); *F16D 2027/001* (2013.01); *F16D 2027/005* (2013.01); *Y10T 29/49073* (2015.01); *Y10T 29/49075* (2015.01)

(58) Field of Classification Search
None
See application file for complete search history.

(56) References Cited

U.S. PATENT DOCUMENTS 2,605,877 A * 8/1952 Winther .................. F16D 27/00
                                                                192/107 R
2,684,744 A * 7/1954 Myers ................... F16D 65/128
                                                                188/264 A
(Continued)

FOREIGN PATENT DOCUMENTS

| CN | 1664393 A | 9/2005 |
| CN | 101782012 A | 7/2010 |

(Continued)

*Primary Examiner* — Jacob S Scott

(57) ABSTRACT

Provided are an opposed iron core transmitting rotation motion, a manufacturing method thereof, and an electromagnetic fan clutch formed by the opposed iron core. The opposed iron core includes iron core grooves (12; 13) axially arranged in a back-to-back manner on an electromagnetic iron core body (11). The manufacturing method of the opposed iron core includes: directly drawing the iron core body (11) to form the iron core grooves arranged in the back-to-back manner, or directly spinning the iron core body (11) to form the iron core grooves arranged in the back-to-back manner. The electromagnetic fan clutch formed by the opposed iron core has a first actuation gap (841) and a second actuation gap (842) respectively on two sides of the electromagnetic iron core body (11) of an opposed iron core apparatus.

19 Claims, 9 Drawing Sheets

(56) References Cited

U.S. PATENT DOCUMENTS

| | | | | |
|---|---|---|---|---|
| 2,825,233 | A | * | 3/1958 | Jacobs .............. F16H 61/66236 |
| | | | | 192/103 A |
| 3,053,364 | A | | 9/1962 | Thielmann |
| 3,455,419 | A | | 7/1969 | Miguel |
| 4,926,992 | A | * | 5/1990 | Linnig ...................... F01P 7/04 |
| | | | | 192/48.2 |
| 5,445,259 | A | * | 8/1995 | Nelson .................. F16D 27/112 |
| | | | | 192/107 R |
| 7,900,760 | B2 | * | 3/2011 | Houle ..................... F16D 21/06 |
| | | | | 192/48.2 |
| 2003/0076002 | A1 | * | 4/2003 | Pritchard ............... B21D 22/16 |
| | | | | 310/265 |

FOREIGN PATENT DOCUMENTS

| | | |
|---|---|---|
| CN | 101881209 A | 11/2010 |
| CN | 201689752 U | 12/2010 |
| CN | 101968004 A | 2/2011 |
| CN | 102003266 A | 4/2011 |
| CN | 202673430 U | 1/2013 |
| CN | 202707212 U | 1/2013 |

* cited by examiner

OPPOSED IRON CORE, MANUFACTURING METHOD THEREOF, AND ELECTROMAGNETIC FAN CLUTCH USING OPPOSITE IRON CORE

CROSS REFERENCE OF RELATED APPLICATION

This is a U.S. National Stage under 35 U.S.C 371 of the International Application PCT/CN2012/073308, filed Mar. 30, 2012.

BACKGROUND OF THE PRESENT INVENTION

Field of Invention

The present invention relates to an opposed iron core transmitting rotation motion, a manufacturing method thereof and a related clutch, and in particular relates to an opposed iron core for a vehicle electromagnetic fan clutch, a manufacturing method thereof and an electromagnetic fan clutch including the opposed iron core.

Description of Related Arts

For the present invention, those skilled in the art may consult a Chinese patent document entitled "STRONGLY-FLEXIBLE DRIVING ELECTROMAGNETIC FAN CLUTCH FOR HIGH-POWER HEAVY-DUTY VEHICLE" with the publication number "CN101968004A".

For the present invention, those skilled in the art may also consult a Chinese patent application No. 201010588608.2 filed on Dec. 7, 2010 and entitled "VEHICLE ELECTROMAGNETIC FAN CLUTCH", a Chinese patent application No. 201020659237.8 filed on Dec. 7, 2010 and entitled "VEHICLE ELECTROMAGNETIC FAN CLUTCH", a Chinese patent application No. 201010621450.4 filed on Dec. 27, 2010 and entitled "MAGNET FIXING DISC WITH CYCLONE HEAT DISSIPATION FAN BLADES", and a Chinese patent application No. 201020697219.9 filed on Dec. 27, 2010 and entitled "MAGNET FIXING DISC WITH CYCLONE HEAT DISSIPATION FAN BLADES", which were proposed by the present applicant.

For the present invention, those skilled in the art may further consult related contents of an invention patent application proposed by the present applicant, published on Mar. 17, 2010 with the publication number CN101672210A and entitled "THREE-SPEED ELECTROMAGNETIC FAN CLUTCH".

Due to various reasons, there are many defects of over large size, poor stability, high manufacturing cost and short service life of electromagnetic fan clutches as well as components and devices thereof in the conventional clutches, particularly in various vehicle electromagnetic fan clutches listed above.

Particularly, in the manufacturing process of an electromagnetic fan clutch, the traditional electromagnetic iron core always adopts the form recorded by the present invention in FIG. 1. An electromagnetic iron core body 1' provided with one or more annular grooves 2' and 3' opened towards the same side of the electromagnetic iron core body 1' is cast first by using a mold, and then corresponding electromagnetic coils 7' and 8' are placed in the annular grooves 2' and 3'. The electromagnetic coils 7' and 8' are respectively provided with paired leading-out terminals 9' and 10', 11' and 12', then the leading-out terminals may penetrate through corresponding paired lead holes 16' punched in a single annular friction plate, corresponding lead slots are inwards adaptively formed along the radial direction of the friction plate according to the random positions of the lead holes 16', so that the lead terminals are connected to the corresponding positions, e.g. the inner part of a driving shaft, and the lead terminals are finally extended and connected to corresponding power supply circuits. Finally, the single annular friction plate 13' is fixed on a side wall end edge 6' of the opening of the corresponding annular groove by welding through a plurality of spots, that is to say, the annular friction plate 13' completely covers the side wall end edge 6'. A through hole 14' of the single annular friction plate is greater than the outer circumference of an electromagnetic iron core through hole 4' and is correspondingly sleeved on the electromagnetic iron core through hole 4'.

Since a part of electromagnetic force is counteracted by mutual interference of the electromagnetic coils, larger coils are needed to meet the practical requirements of the electromagnetic clutch in use, so that the volume and size of the aforementioned electromagnetic iron core are relatively large. Meanwhile, the friction plate is provided with the lead holes or slots, and stress, fatigue and slits or cracks are produced after long-time friction use, so that the service lives of the friction plate and the whole electromagnetic clutch are shortened. Moreover, this form and structure lead to high material consumption and high manufacturing cost, and many manual factors in the process part are not favorable for large-scale production and fine machining.

SUMMARY OF THE PRESENT INVENTION

An aim of the present invention is to provide an electromagnetic iron core apparatus for a clutch with a brand-new structure.

Another aim of the present invention is to provide a method for manufacturing the electromagnetic iron core apparatus.

Still another aim of the present invention is to provide an electromagnetic fan clutch with a brand-new structure.

An opposed electromagnetic iron core of the present invention includes iron core grooves axially arranged in a back-to-back manner on an electromagnetic iron core body.

The opposed electromagnetic iron core of the present invention further includes friction plates arranged in a back-to-back manner on the iron core grooves.

The opposed electromagnetic iron core of the present invention further includes coils accommodated in the iron core grooves and arranged in a back-to-back manner.

Each aforementioned technical feature further reduces the size of the iron core and further saves manufacturing materials.

According to the opposed electromagnetic iron core of the present invention, only one wiring terminal of each of the coils is led out from an iron core through hole of the iron core body.

According to the opposed electromagnetic iron core of the present invention, the bonding terminals of the coils are directly connected with the iron core body.

According to the opposed electromagnetic iron core of the present invention, the wiring terminals and the bonding terminals are positioned on the same side of the iron core body.

Each aforementioned technical feature further reduces the size of the iron core and further saves the manufacturing materials, so that the wiring structure is more reasonable.

According to the opposed electromagnetic iron core of the present invention, the iron core grooves include a first annular groove and a second annular groove.

According to the opposed electromagnetic iron core of the present invention, the iron core grooves include first square grooves and second square grooves.

According to the opposed electromagnetic iron core of the present invention, the friction plates include an annular large friction plate and an annular small friction plate, the annular large friction plate is clamped in the opening of the first annular groove, and the annular small friction plate is clamped in the opening of the second annular groove.

Each aforementioned technical feature further reduces the size of the iron core and further saves the manufacturing materials, so that the structure of the iron core is more reasonable.

According to the opposed electromagnetic iron core of the present invention, reinforcing corrugations are formed on the inner side wall of the open end of each of the iron core grooves.

According to the opposed electromagnetic iron core of the present invention, the section heights of the reinforcing corrugations are 0.1-5 millimeters.

Each aforementioned technical feature further improves the overall strength and durability of the iron core.

According to the opposed electromagnetic iron core of the present invention, a first through slot, a first semi-through slot, a second semi-through slot, a third semi-through slot, a first through hole, a second through hole, a third through hole and a fourth through hole are formed in the bottom end surface of the second annular groove.

Each aforementioned technical feature further reduces the size and further saves the manufacturing materials, so that the wiring structure is more reasonable.

According to the opposed electromagnetic iron core of the present invention, the third through hole is provided with a first trapezoidal platform, and the second through hole is provided with a second trapezoidal platform.

Each aforementioned technical feature further improves the durability of the whole iron core and the bonding strength of the lead terminals.

The manufacturing method for the opposed iron core of the present invention includes the step of directly drawing the iron core body to form the iron core grooves arranged in the back-to-back manner.

Each aforementioned technical feature enables the process method for the iron core to be simple, procedure-saving and material-saving, and enables large-scale manufacturing to become possible.

The manufacturing method for the opposed iron core of the present invention includes the step of directly spinning the iron core body to form the iron core grooves arranged in the back-to-back manner.

Each aforementioned technical feature enables the process method for the iron core to be simple, procedure-saving and material-saving, and enables large-scale manufacturing to become possible.

The manufacturing method for the opposed iron core of the present invention includes the steps of: placing the coils opposite to each other; leading only one wiring terminal of each of the coils out from an iron core through hole of each iron core groove; connecting the bonding terminals of the coils with the iron core body; and clamping the friction plates opposite to each other.

The aforementioned technical scheme enables the process method for the iron core to be simple, procedure-saving and material-saving, and enables large-scale manufacturing to become possible.

The present invention provides an electromagnetic fan clutch of the opposed iron core.

According to the electromagnetic fan clutch of the present invention, a first actuation gap and a second actuation gap are respectively formed on two sides of the opposed electromagnetic iron core apparatus.

The actuation gaps are respectively formed on the two sides of the iron core apparatus, so that the heat dissipation efficiency is improved, and the size of the clutch is further reduced.

According to the electromagnetic fan clutch of the present invention, each wiring terminal of each coil is led out from a lead slot of a main shaft.

According to the electromagnetic fan clutch of the present invention, there are a plurality of lead slots symmetrical to each other.

According to the electromagnetic fan clutch of the present invention, the main shaft is provided with a two-step platform.

According to the electromagnetic fan clutch of the present invention, the main shaft is a hollow tubular component.

According to the electromagnetic fan clutch of the present invention, the left side of a driving disc is in tight fit with a fan fixing disc bearing on the main shaft, the outer ring of the fan fixing disc bearing is in tight fit with a fan fixing disc, a second shaft sleeve is arranged close to the left side of the fan fixing disc bearing on the main shaft in a tight fit manner, the left side of the fan fixing disc is connected with a large spring piece and a large sucking disc, the iron core through hole of the electromagnetic iron core apparatus is in tight fit with the main shaft and close to the left side of the second shaft sleeve, a fastening cover fixing bearing is arranged close to the left side of the electromagnetic iron core apparatus on the main shaft in a tight fit manner, a fastening cover is arranged on the outer ring of the fastening cover fixing bearing in a tight fit manner, a small spring piece and a small sucking disc are sequentially arranged on the fastening cover, the fastening cover fixing bearing is accommodated by a fastening hole of the fastening cover and is in tight fit with an inner wall of the fastening hole, and a fixing bolt is screwed with threads of the main shaft.

According to the electromagnetic fan clutch of the present invention, the fan fixing disc is provided with a first annular side wall sleeved on the electromagnetic iron core apparatus, an annular soft iron is embedded into the end part of the first annular side wall, a magnet fixing disc cover is connected to the fastening cover, and an annular magnet fixing disc is connected to the inner edge of the magnet fixing disc cover.

According to the electromagnetic fan clutch of the present invention, the fan fixing disc is provided with an annular groove for accommodating the magnet fixing disc, the fastening cover is provided with a first annular side wall sleeved on the electromagnetic iron core apparatus, and an annular soft iron is embedded into the end part of the first annular side wall.

Through each aforementioned technical feature, the overall size of the electromagnetic fan clutch is reduced, the overall manufacturing cost is reduced, the materials are saved, the structure is more reasonable, and the service life is obviously prolonged.

DETAILED DESCRIPTION OF THE PREFERRED EMBODIMENT

Figure 1:
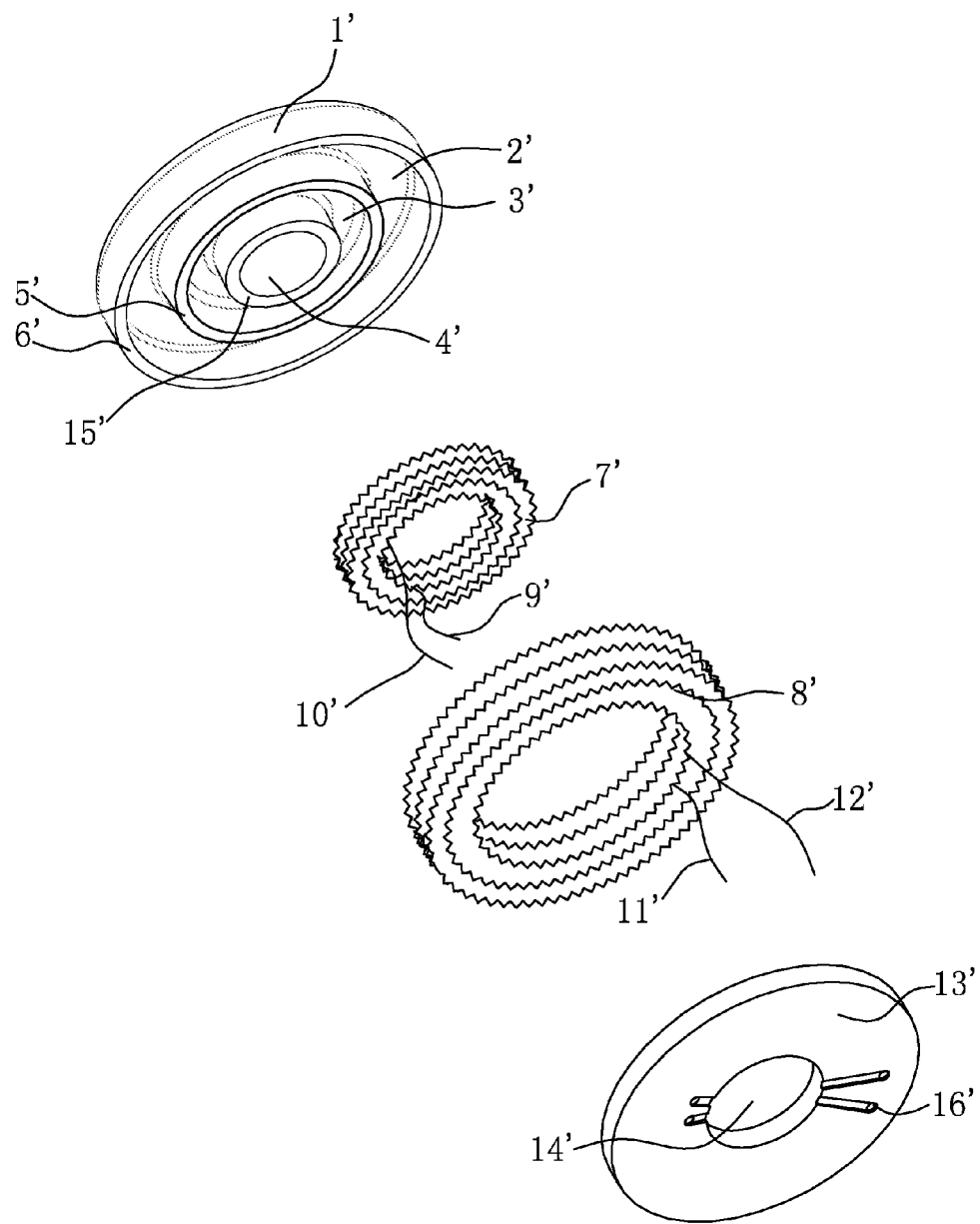
FIG. 1 is a schematic diagram of background art of the present invention.

A first embodiment of an electromagnetic iron core apparatus of the present invention is given.

Refer to FIG. 2, FIG. 3, FIG. 4, FIG. 5A, FIG. 5B and FIG. 6, which show the first embodiment of the electromagnetic iron core apparatus of the present invention.

Refer to FIG. 2, FIG. 4, FIG. 5A and FIG. 5B, wherein a first annular groove 12 is formed in one end of an iron core body 11 of the present invention, a second annular groove 13 is formed in the other end of the iron core body 11 of the present invention, and the circle center of the first annular groove 12 and the circle center of the second annular groove 13 are in the axial direction of the iron core body 11 and are superposed with each other. An iron core through hole 4 is formed in the center of the iron core body 11, and a section of the iron core through hole 4 extends towards the opening of the second annular groove 13 to form a shaft pin sleeve 5. The inner side wall 121 of the first annular groove 12 is superposed with the outer side wall 122 of the second annular groove 13 to form a common side wall. The open end surface of the first annular groove 12 and the bottom end surface 124 of the second annular groove 13 are positioned on the same horizontal plane. Correspondingly, the bottom end surface of the first annular groove 12 and the open end surface of the second annular groove 13 are positioned on the same horizontal plane. First isometric bonding force and clamping force reinforcing corrugations 130 of which sections are semicircular are correspondingly formed on the inner sides of the outer wall and inner wall of the open part of the first annular groove 12, and the section radii or section heights of the semicircular parts are preferably 0.1 to 5 millimeters. Similarly, second isometric bonding force and clamping force reinforcing corrugations 131 of which sections are semicircular are correspondingly formed on the inner sides of the outer wall and inner wall of the open part of the second annular groove 13, and the section radii or section heights of the semicircular parts are preferably 0.1 to 5 millimeters.

Figure 2:
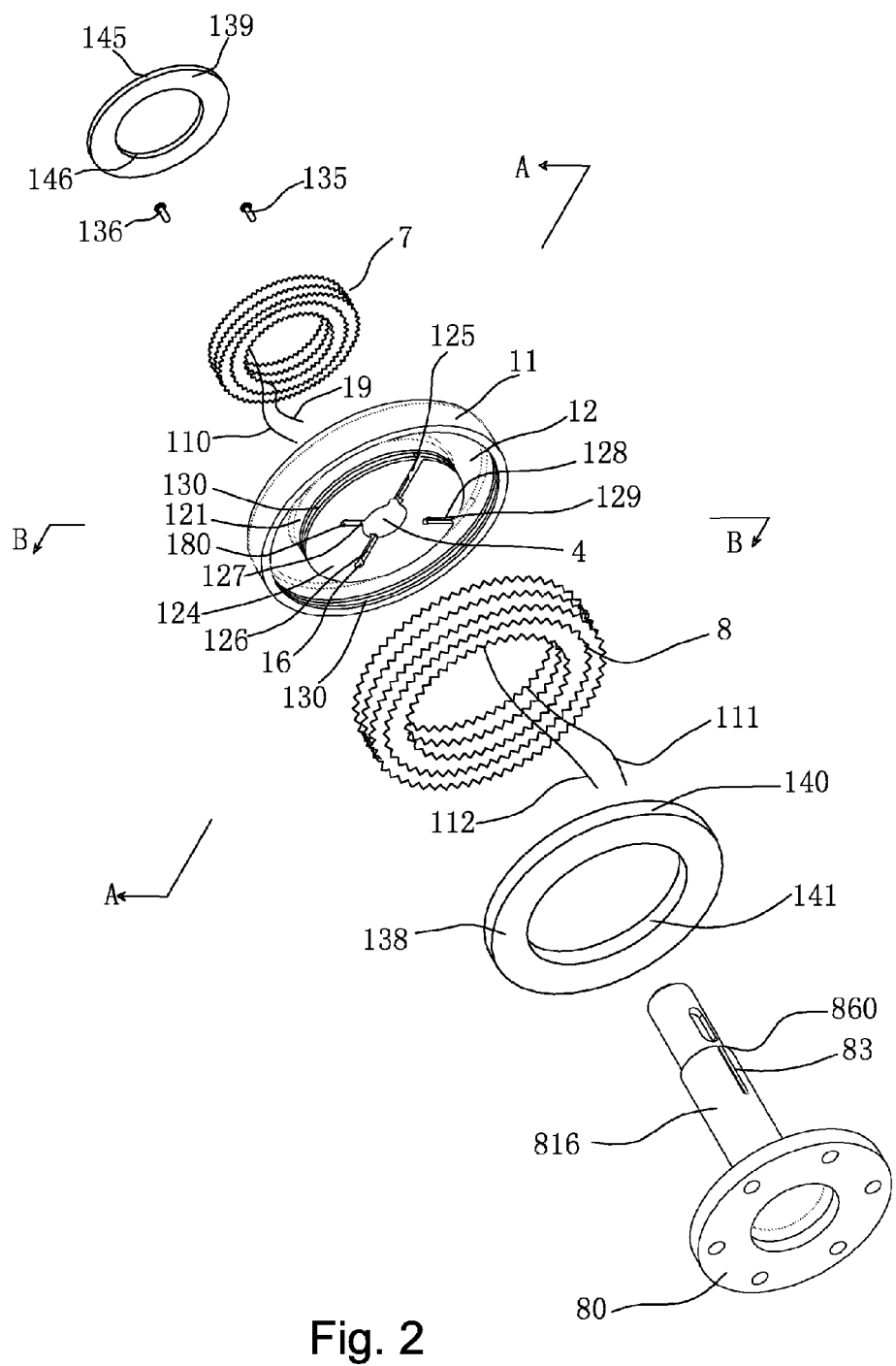
FIG. 2 is a schematic diagram of a first embodiment of an electromagnetic iron core apparatus of the present invention.

Refer to FIG. 2, wherein a first through slot 125 is outwards formed in the bottom end surface 124 of the second annular groove 13 along the radial direction and provided with two openings. A first semi-through slot 126 is inwards formed at the radial opposite position of the first through slot 125 along the radial direction of the bottom end surface 124, and the unique opening of the first semi-through slot 126 faces the iron core through hole 4. A first through hole 16 is formed vertical to the iron core body 11 at the radial outward farthest end of the first semi-through slot 126. A second semi-through slot 127 similar to the first semi-through slot 126 is formed in a manner that the clockwise included angle between the second semi-through slot 127 and the first semi-through slot 126 is 90° and used for counterweight and dynamic balance of the iron core body 11, the unique opening of the second semi-through slot 127 faces the iron core through hole 4, and a second through hole 180 is formed vertical to the iron core body 11 at the radial outward farthest end of the second semi-through slot 127. Refer to FIG. 5B, wherein the second through hole 180 is enlarged into a part with relatively large sectional area before extending into the second annular groove 13, so as to form a second trapezoidal platform 133. Refer to FIG. 2 and FIG. 5B, wherein a fourth through hole 181 is also formed in the direction from the second through hole 180 to the iron core through hole 4 along the second semi-through slot 127. Refer to FIG. 2 and FIG. 5B, wherein a third semi-through slot 128 is formed outwards along the radial direction of the bottom end surface 124 in a manner that the clockwise included angle between the third semi-through slot 128 and the first through slot 125 is 90°, the opening of the third semi-through slot 128 faces the first annular groove 12, and a third through hole 129 is formed vertically at the radial innermost end of the third semi-through slot 128. The third through hole 129 is enlarged into a part with relatively large sectional area before extending into the second annular groove 13, so as to form a first trapezoidal platform 132.

Figure 5A:
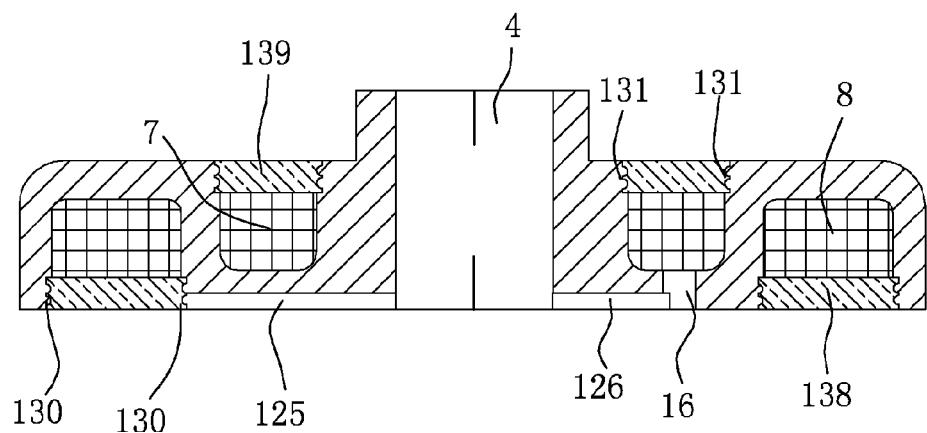
FIG. 5A is a section view of the iron core body in FIG. 2 along the A-A direction.
Figure 5B:
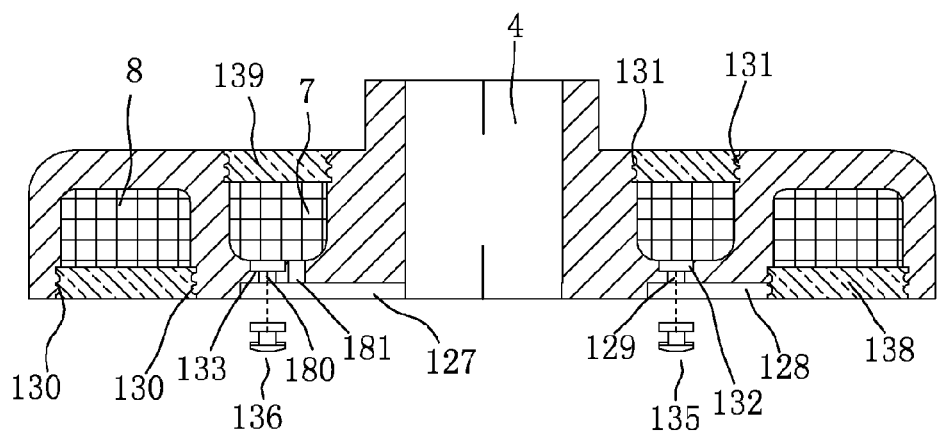
FIG. 5B is a section view of the iron core body in FIG. 2 along the B-B direction.

Refer to FIG. 5A, FIG. 5B and FIG. 2, wherein a large coil 8 is placed in the first annular groove 12, a large annular friction plate 138 covers the large coil 8, and the outer edge 140 and inner edge 141 of the large annular friction plate 138 are clamped and further bonded with the first reinforcing corrugations 130. A leading-out wire of the large coil 8 penetrates via the third semi-through slot 128 and is fixed with a rivet, bonded to the third through hole 129 and positioned in the third semi-through slot 128; and the other leading-out wire of the large coil 8 penetrates via the first through slot 125 and is led into the through hole 4 of the iron core body 11. A small coil 7 is placed in the second annular groove 13, a small annular friction plate 139 covers the small coil 7, and the outer edge 145 and inner edge 146 of the small annular friction plate 139 are clamped and further bonded with the second reinforcing corrugations 131. A leading-out wire of the small coil 7 penetrates via the fourth through hole 181 from one side of the second annular groove 13, extends outwards along the radial direction of the second semi-through slot 127 and is fixed with a rivet, bonded to the second through hole 180 and positioned in the second semi-through slot 127; and the other leading-out wire of the small coil 7 penetrates via the first through hole 16 and is led into the through hole 4 of the iron core body 11 along the first semi-through slot 126. The riveting may also be replaced by a connecting manner of screwing or welding and the like, as long as the bonding is reliably placed on the iron core body 11.

On the whole, in the electromagnetic iron core apparatus of the first embodiment of the present invention, the first annular groove 12 and the second annular groove 13 are axially arranged in a back-to-back manner on the electromagnetic iron core body 11, and have opposite open directions, namely are arranged and distributed in an opposed manner. The large coil 8 and the small coil 7 are also arranged in a back-to-back manner on the basis of the open directions of the annular grooves 12 and 13, namely arranged and distributed in an opposed manner. The large friction plate 138 and the small friction plate 139 are also arranged in a back-to-back manner on the basis of the open directions of the annular grooves 12 and 13, namely arranged and distributed in an opposed manner.

Manufacturing methods in the first embodiment of the electromagnetic iron core apparatus of the present invention is given.

The first manufacturing method in the first embodiment of the present invention includes:

forging or precision-casting or directly drawing or directly spinning or directly casting the iron core body 11, and lathing iron core grooves arranged in the back-to-back manner, namely the first annular groove 12 and the second annular groove 13 arranged in the back-to-back manner; lathing or milling the bottom end surface 124 to form the first through slot 125, the first semi-through slot 126, the second semi-through slot 127 and the third semi-through slot 128; forming the first through hole 16, the second through hole 180, the third through hole 129 and the fourth through hole 181 through a drilling tool; forming the first trapezoidal platform 132 and the second trapezoidal platform 133 by adopting other drilling tools with different diameters;

placing the large coil 8 into the first annular groove 12, putting the first leading-out terminal 111 of the large coil 8 into the third semi-through slot along the opening of the third semi-through slot 128, putting the first rivet 135 from one side of the first trapezoidal platform 132, then winding the remaining part of the first leading-out terminal 111 on the rivet and fixing the first rivet 135 into the third semi-through slot 128 by using a riveting machine to form a bonding, and cutting the redundant part; enabling the second leading-out terminal 112 of the large coil 8 to penetrate via the first through slot 125 and extend into the iron core through hole 4; pouring an adhesive, e.g. epoxy resin, to the large coil 8 in the first annular groove 12, and then embedding the outer edge 140 and inner edge 141 of the large annular friction plate into the first reinforcing corrugations 130 in a tight fit manner respectively; further bonding and clamping the large friction plate to cover the large coil 8;

placing the small coil 7 into the second annular groove 13, enabling the second leading-out terminal 19 of the small coil 7 to penetrate via the fourth through hole 181 and enter one side of the bottom end part 124, then putting the second rivet 136 via the second through hole 180 along one side of the second trapezoidal platform 133, then outwards extending the remaining part of the second leading-out terminal 19 of the small coil 7 along the radial direction of the second semi-through slot 127 and winding the remaining part on the second rivet 136, fixing the second rivet 136 into the second semi-through slot 127 in the iron core body 11 by using the riveting machine to form a bonding, and cutting the redundant part; enabling the first leading-out terminal 110 of the small coil 7 to penetrate via the first through hole 16 and extend into one side of the bottom end part 124, then placing the first leading-out terminal 110 along the first semi-through slot 126, and finally extending the first leading-out terminal 110 to the iron core through hole 4 from the opening of the first semi-through slot 126; pouring the adhesive, e.g. epoxy resin, to the small coil 7 in the second annular groove 13, and then embedding the outer edge 145 and inner edge 146 of the small annular friction plate 139 into the second reinforcing corrugations 131 in a tight fit manner respectively; further bonding and clamping the small friction plate 139 to cover the small coil 7.

Thus, the electromagnetic iron core apparatus of the first embodiment of the present invention may be formed by the aforementioned first method of the present invention. On the whole, the electromagnetic iron core apparatus is also provided with two annular friction plates 138 and 139 positioned in the opening of the iron core body and arranged oppositely and two leading-out wires 110 and 112 of two coils facing the electromagnetic iron core through hole 4, wherein the two leading-out wires 110 and 112 are connected with the power supply ends of the corresponding electromagnetic coils respectively.

Another manufacturing method for the electromagnetic iron core of the first embodiment of the present invention lies in that the step of forming the iron core grooves is changed into a step of directly drawing the iron core grooves arranged in the back-to-back manner under the condition that other steps of the first method are not changed.

Still another manufacturing method for the electromagnetic iron core of the first embodiment of the present invention lies in that the step of forming the iron core grooves is changed into a step of directly spinning the iron core grooves arranged in the back-to-back manner under the condition that other steps of the first method are not changed.

A second embodiment of the electromagnetic iron core apparatus of the present invention is given.

Figure 10:
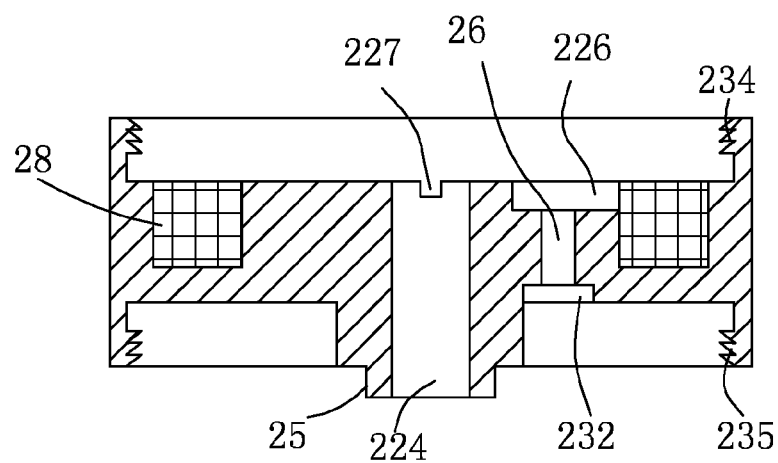
FIG. 10 is a C-C directional section view of the second embodiment of the electromagnetic iron core apparatus of the present invention in FIG. 8.
Figure 9:
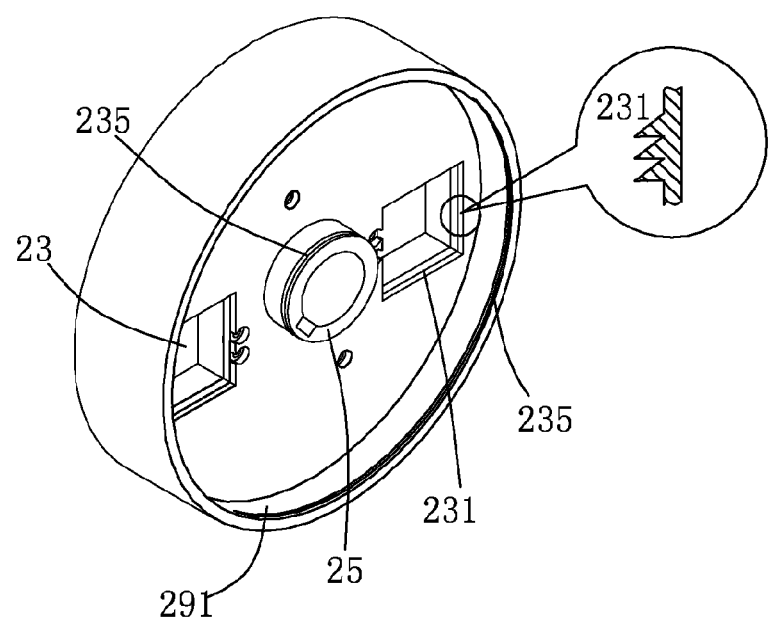
FIG. 9 is another side view of an iron core in FIG. 8.
Figure 8:
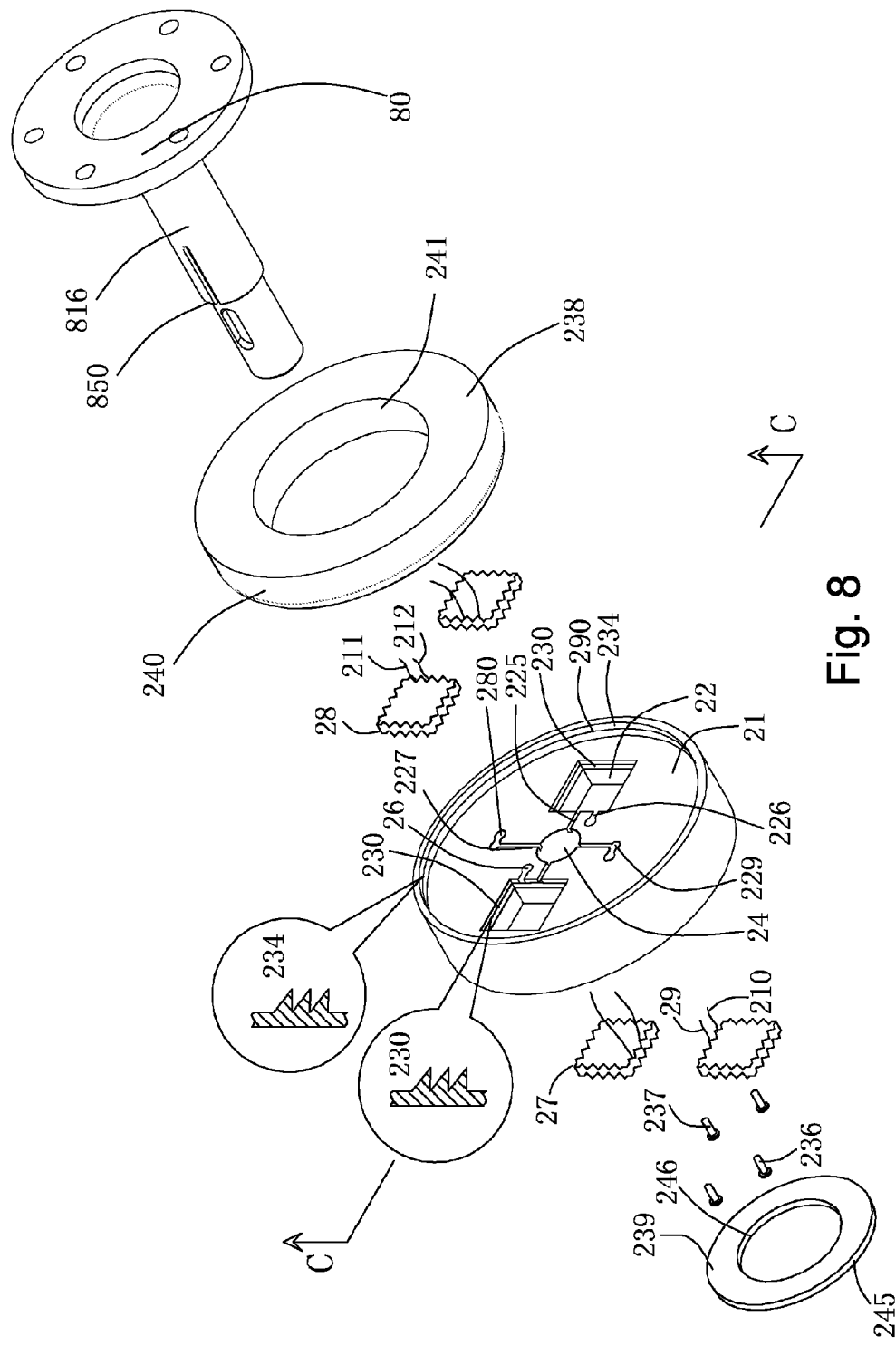
FIG. 8 is a schematic diagram of a second embodiment of the electromagnetic iron core apparatus of the present invention.

Refer to FIG. 8, FIG. 9 and FIG. 10, which show the second embodiment of the electromagnetic iron core apparatus of the present invention.

Two first square grooves 22 are formed in one end of a second iron core body 21 of the present invention, and other two second square grooves 23 are formed in the other axial end of the iron core body 21. An iron core through hole 24 is formed in the center of the iron core body 21, and a section of the iron core through hole 24 extends towards the openings of the second square grooves 23 to form a shaft pin sleeve 25. The iron core body 21 is provided with a first fixing outer edge 290 in the circumferential direction, third triangular isometric clamping force reinforcing corrugations 234 are formed in the opening of the inner side wall of the first fixing outer edge 290, and the section heights of the triangular parts of the third reinforcing corrugations 234 are preferably 0.1 to 5 millimeters. The iron core body 21 is provided with a second fixing outer edge 291 in the circumferential direction of the other side, fourth triangular isometric clamping force reinforcing corrugations 235 are formed in the opening of the inner side wall of the second fixing outer edge 291, the section heights of the triangular parts of the fourth reinforcing corrugations 235 are preferably 0.1 to 5 millimeters, and identical fourth reinforcing corrugations 235 are also formed in the shaft pin sleeve 25. The two first square grooves 22 and the other two second square grooves 23 are uniformly distributed on the iron core body 21, and the central lines of the square grooves are perpendicular to each other on the plane of the iron core body 21. First isometric bonding force and clamping force reinforcing corrugations 230 of which sections are triangular are formed on the inner side wall of the open part of each first square groove 22, and the section heights of the triangular parts are preferably 0.1 to 5 millimeters. Similarly, second isometric bonding force and clamping force reinforcing corrugations 231 of which sections are triangular are correspondingly formed on the inner side wall of the open part of each second square groove 23, and the section heights of the triangular parts are preferably 0.1 to 5 millimeters.

Two first through slots 225 are formed inwards in the two first square grooves 22 along the radial direction respectively, and each first through slot 225 is provided with an opening facing the iron core through hole 24 and an opening facing the first square groove 22. Other two first semi-through slots 226 are formed in parallel to the left sides of the two first through slots 225 respectively, two first through holes 26 are formed close to the end points of the iron core through hole 24, and the two first through holes 26 are enlarged into parts with relatively large sectional areas before extending into the other side of the iron core body 21, so as to form two first trapezoidal platforms 232. Two reverse "7"-shaped second semi-through slots 227 are formed in a manner that the clockwise included angles between the second semi-through slots 227 and the two first through slots 225 are 90°, the openings of the two slots face the iron core through hole 24, and two second through holes 280 are formed vertical to the iron core body at the blind ends of the two second semi-through slots 227. The two second through holes 280 are enlarged into parts with relatively large sectional areas before extending into the other side of the iron core body 21, so as to form two second trapezoidal platforms 233. A third through hole 229 is formed in the corner of each reverse "7"-shaped second semi-through slot 227 respectively.

Two first coils 28 are placed in the two first square grooves 22 respectively, a large annular friction plate 238 covers each first coil 28, the large annular friction plates 238 are clamped via the inner side wall of the first fixing outer edge 290 of the iron core body 21, the clamping force is improved via the third reinforcing corrugations 234, and further bonding may be realized via an adhesive such as epoxy resin attached to the first reinforcing corrugations 230. A leading-out wire 211 of each of the two first coils 28 penetrates through each of the two first semi-through slots 226 and then is fixed with a rivet, bonded to each of the two first through holes 26 and positioned in each first semi-through slot 226; and the other two leading-out wires 212 of the two first coils 28 penetrate via the two first through slots 225 respectively and are led into the through hole 24 of the iron core body 21. Two second coils 27 are placed in the two square grooves 23 on the other side of the iron core body 21 respectively, a small annular friction plate 239 covers each second coil 27, the inner edge 246 and outer edge 245 of each small annular friction plate 239 are clamped via the fourth reinforcing corrugations 235 and further bonded via the adhesive such as epoxy resin attached to the second reinforcing corrugations 231. Two paired leading-out wires of each of the two second coils 27 penetrate through the two through holes 229 respectively, wherein one leading-out wire is fixed with a rivet from the blind end of each second semi-through slot 227 to each second through hole 280, bonded to the second through hole 280 and positioned in the second semi-through slot 227; and the other leading-out wire of each of the two second coils 27 is led into the through hole 24 of the iron core body 21 along the open direction of each first semi-through slot 227. The aforementioned riveting may also be replaced by a connecting manner of screwing or welding and the like, as long as the bonding is reliably placed on the iron core body 21.

On the whole, in the electromagnetic iron core apparatus of the second embodiment of the present invention, the two first square grooves 22 and the other two second square groove 23 are axially arranged in a back-to-back manner on the iron core body 21, and have opposite open directions, namely are arranged and distributed in an opposed manner. The two first coils 28 and the other two second coils 27 are also arranged in a back-to-back manner on the basis of the open directions of the square grooves, namely arranged and distributed in an opposed manner. The large friction plates 238 and the small friction plates 239 are also arranged in a back-to-back manner on the basis of the open directions of the square grooves 22 and 23, namely arranged and distributed in an opposed manner. The large friction plates 238 and the small friction plates are also positioned in the opening of the iron core body and provided with four leading-out wires 210 and 212 of the four coils facing the electromagnetic iron core through hole 24, wherein the four leading-out wires 210 and 212 are connected with the power supply ends of the coils respectively.

Manufacturing methods in the second embodiment of the electromagnetic iron core apparatus of the present invention is given.

The first manufacturing method in the second embodiment of the present invention includes:

forging or precision-casting or directly drawing or directly spinning or directly casting the iron core body 21, and simultaneously lathing iron core grooves arranged in the back-to-back manner, namely the two first square grooves 22 and the two second square grooves 23 arranged in the back-to-back manner; lathing or milling an end surface of the iron core body 21 to form the two first through slots 225, the two first semi-through slots 226 and the two second semi-through slots 227; forming the two first through holes 26, the two second through holes 280 and the two third through holes 229 through a drilling tool; forming the two first trapezoidal platforms 232 and the two second trapezoidal platforms 233 by adopting drilling tools with different diameters;

placing the two first coils 28 into the first square grooves 22 respectively, putting the first leading-out terminals 211 of the two first coils 28 into the first semi-through slots 226 along the openings of the first semi-through slots 226, putting each first rivet 237 from one side of each first trapezoidal platform 232, then winding the remaining part of each first leading-out terminal 211 on the rivet and fixing the first rivet 237 into each first through hole 26 in each first semi-through slot 226 by using a riveting machine to form a bonding, and cutting the redundant part; enabling the second leading-out terminals 212 of the first coils 28 to penetrate through the first through slots 225 and extend into the iron core through hole 24; pouring an adhesive, e.g. epoxy resin, to the two first coils 28 in the first square grooves 22, then embedding the outer edges 240 of the large annular friction plates 238 into the third reinforcing corrugations 234 in a tight fit manner, and bonding the outer edges 240 via the adhesive attached to the first reinforcing corrugations 230; further bonding and clamping the large friction plates 238 to cover the two first coils 28;

placing the two second coils 27 into the second square grooves 23, enabling two pairs of leading-out terminals 29 and 210 of the two small coils 27 to penetrate through the third through holes 229 and enter one side of each of the first square grooves 22, then putting the second rivets 236 via the second through holes 280 along one side of each of the second trapezoidal platforms 233, then extending the remaining parts of the second leading-out terminals 29 of the second coils 27 to the blind ends of the second semi-through slots 227 and winding the remaining parts on the second rivets 236, fixing the second rivets 236 into the second semi-through slots 227 in the iron core body 21 by using the riveting machine to form bondings, and cutting the redundant parts; extending the first leading-out terminals 210 of the second coils 27 along the open directions of the second semi-through slots 227 to enter the iron core through hole 24; pouring the adhesive, e.g. epoxy resin, to the second coils 27 in the second square grooves 23, then embedding the outer edges 245 and inner edges 246 of the small annular friction plates 239 into the fourth reinforcing corrugations 235 in a tight fit manner respectively, and bonding the outer edges 245 and the inner edges 246 via the adhesive attached to the second reinforcing corrugations 231; further bonding and clamping the small friction plates 239 to cover the second coils 27.

Thus, the electromagnetic iron core apparatus of the second embodiment of the present invention may be formed by the aforementioned first method of the present invention. On the whole, the electromagnetic iron core apparatus is provided with two annular friction plates 238/239 arranged oppositely and clamped in the fixing edges of the iron core body and four leading-out wires 210 and 212 of two pairs of coils facing the electromagnetic iron core through hole 24, wherein the four leading-out wires 210 and 212 are connected with the power supply ends of the corresponding electromagnetic coils respectively.

Another manufacturing method for the electromagnetic iron core of the second embodiment of the present invention lies in that the step of forming the iron core grooves is changed into a step of directly drawing the iron core grooves arranged in the back-to-back manner under the condition that other steps of the first manufacturing method of the second embodiment are not changed.

Still another manufacturing method for the electromagnetic iron core of the second embodiment of the present invention lies in that the step of forming the iron core grooves is changed into a step of directly spinning the iron core grooves arranged in the back-to-back manner under the condition that other steps of the first manufacturing method of the second embodiment are not changed.

Figure 3:
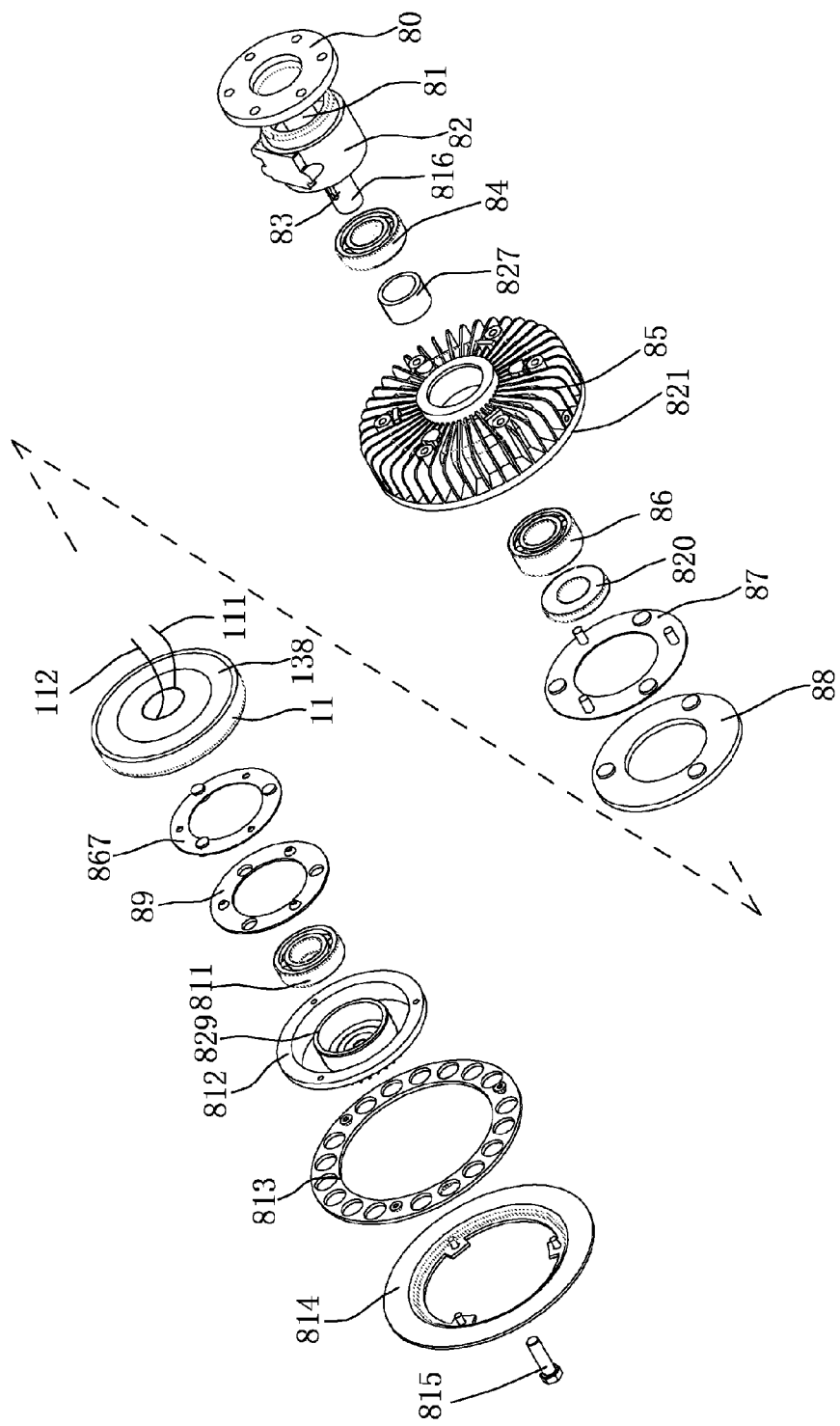
FIG. 3 is a schematic diagram showing that the first embodiment of the electromagnetic iron core apparatus of the present invention is applied to a three-speed electromagnetic clutch.
Figure 4:
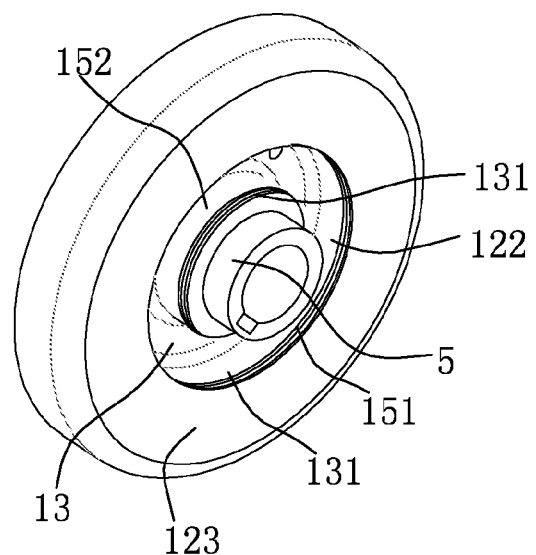
FIG. 4 is a schematic diagram of the other direction of an iron core body in FIG. 2 of the present invention.
Figure 6:
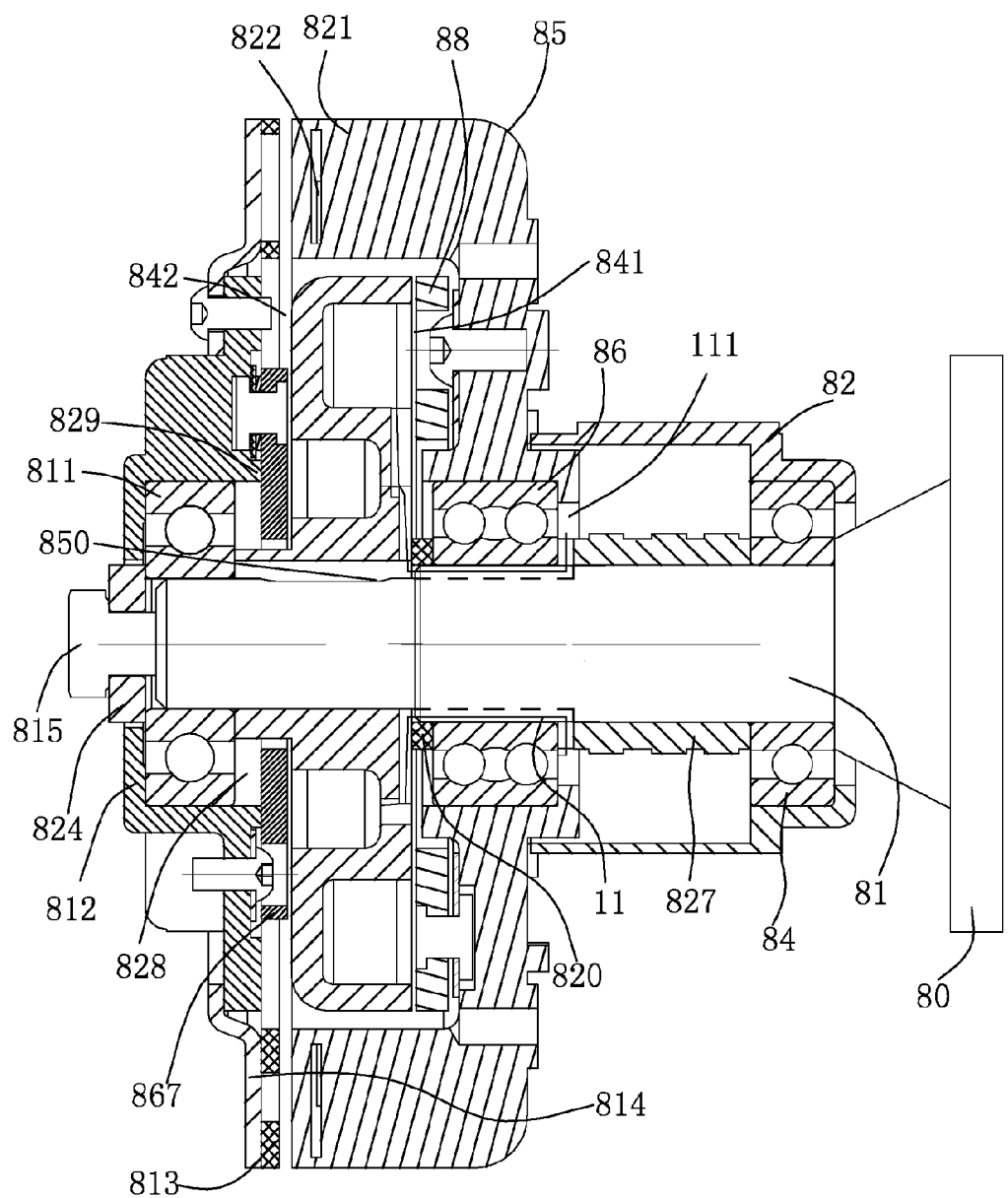
FIG. 6 is a section view of FIG. 3.

Refer to FIG. 3, FIG. 2 and FIG. 6. FIG. 3 shows a situation that an electromagnetic fan clutch of the present invention is formed by the first embodiment of the electromagnetic iron core apparatus of the present invention.

A first embodiment of the electromagnetic fan clutch of the present invention will be given.

Figure 7:
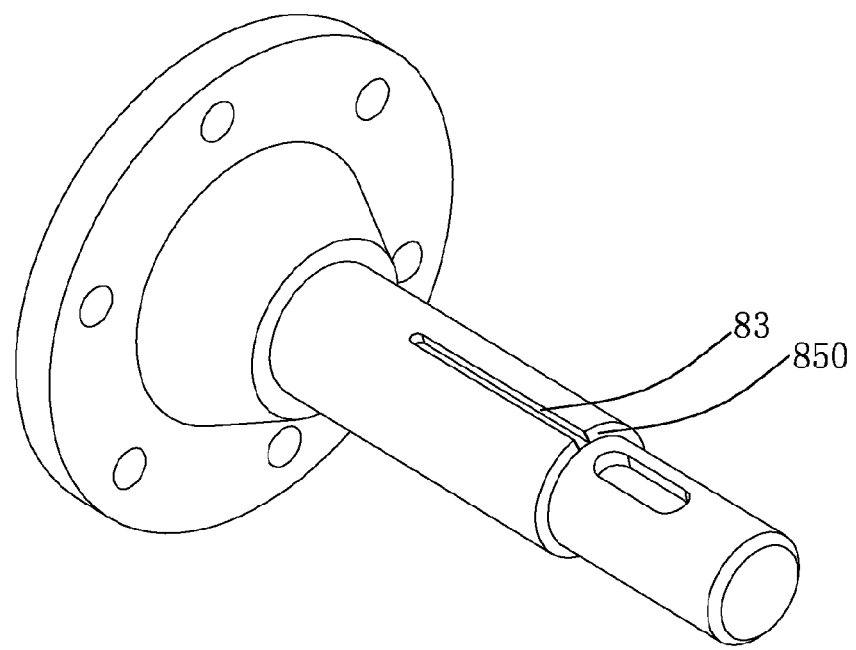
FIG. 7 is a schematic diagram of the other direction of a driving disc and a main shaft in FIG. 2.

The electromagnetic fan clutch of the present invention consists of a driving shaft 81, wherein the driving shaft 81 includes a main shaft 816 which may be hollow and a driving disc body 80, a lead slot 83 is formed in the main shaft 816, and the lead slot 83 is suitable for accommodating multiple enameled wires. The lead slot 83 is extended to a position close to the driving disc body 80, and a dust cover 82 and an electric brush device cover the lead slot 83. The dust cover is in tight fit to one side of the driving disc 80 of the main shaft 816 via a dust cover fixing bearing 84, and the outer ring of the dust cover fixing bearing 84 is in tight fit with the dust cover 82. A first shaft sleeve 827 made of steel 45 is arranged on the left side of the dust cover fixing bearing 84, the left side of first shaft sleeve 827 is in tight fit with a fan fixing disc bearing 86 along the main shaft 816, and the outer ring of the fan fixing disc bearing 86 is in tight fit with a fan fixing disc 85. The left side of the dust cover 82 is clamped at the right side end part of the fan fixing disc 85 and sealed. A second shaft sleeve 820 made of the steel 45 is arranged close to the left side of the fan fixing disc bearing 86 on the main shaft 816 in a tight fit manner and used for forming a first actuation gap 841. Refer to FIG. 6 and FIG. 7, wherein the main shaft 816 is radially shrunk on the left side of the second shaft sleeve to form a two-step platform 850, so as to further reduce the material and weight of the electromagnetic fan clutch of the present invention. Refer to FIG. 6, wherein a large spring piece 87 and a large actuation disc 88 are screwed to the left side of the fan fixing disc 85. The iron core through hole 4 of the electromagnetic iron core apparatus 11 of the first embodiment of the present invention is in tight fit with the main shaft 816 and sleeved with the main shaft 816 in a tight fit manner close to the left side of the second shaft sleeve 820, and thus the first actuation gap 841 is formed between the iron core through hole 4 and the large actuation disc 88. The electromagnetic iron core apparatus 11 of the first embodiment of the present invention may further be fixed on the main shaft 816 via a slot of the shaft pin sleeve 5 thereof by virtue of a pin or a flat key or a spline. The other effect of the shaft pin sleeve 5 lies in forming a second actuation gap 842, and the shaft pin sleeve 5 may also be substituted by a third shaft sleeve (not shown in the figure) made of the steel 45 to form the second actuation gap 842. The fan fixing disc 85 is provided with a first annular side wall 821 sleeved on the electromagnetic iron core apparatus 11 of the first embodiment of the present invention, and an annular soft iron 822 is embedded into the top end of the first annular side wall 821 and used for producing an induced magnetic field when magnetic eddy current is produced and being driven by the magnetic eddy current. A fastening cover fixing bearing 811 is arranged close to the left side of the electromagnetic iron core apparatus 11 of the first embodiment of the present invention on the main shaft 816 in a tight fit manner, and a fastening cover 812 is arranged on the outer ring of the fastening cover fixing bearing 811 in a tight fit manner. The fastening cover 812 is also screwed with a magnet fixing disc cover 814, the inner edge of the magnet fixing disc cover 814 is screwed with an annular magnet fixing disc 813, a plurality of disc-shaped permanent magnets for producing the magnetic eddy current are embedded into the magnet fixing disc 813, the second actuation gap 842 is formed between the magnet fixing disc 813 and the left side of the electromagnetic iron core apparatus, and particularly the second actuation gap 842 is formed between a small actuation disc 867 and the left side of the electromagnetic iron core apparatus. A small spring piece 89 and the small actuation disc 867 are sequentially arranged on the fastening cover 812. The fastening cover fixing bearing 811 is accommodated by a fastening hole 828 of the fastening cover 812 and is in tight fit with the inner wall of the fastening hole 828, then a fixing bolt 815 is screwed and fixed with the thread of the main shaft 816, and each aforementioned component is compacted on the left side wall of the driving disc 80 on the main shaft 816 so as to realize overall mutual fixing. The main shaft 816 may be a hollow tubular component, and may be formed integrally with the driving disc 80 to further improve the strength of the electromagnetic clutch of the present invention, reduce the weight of the electromagnetic clutch and save materials.

The working process of the aforementioned first embodiment of the electromagnetic fan clutch of the present invention is as follows.

When both the large coil lead 112 and the small coil lead 110 are not electrified, the driving disc 80 drives the main shaft 816 to rotate, and the fan fixing disc 85 freely rotates relative to the main shaft 816 due to the free sliding effects of the dust cover fixing bearing 84, the fan fixing disc bearing 86 and the fastening cover fixing bearing 811.

When the large coil lead 112 is not electrified but the small coil lead 110 is electrified, the small actuation disc 867 connected to the fastening cover 812 by the small spring piece 89 is pulled to the small friction plate 139 of the electromagnetic iron core 11 by the electromagnetic force produced by the small coil and finally attracts the small friction plate 139 relatively fixedly after semi-linkage, so that the angular speed of the magnet fixing disc is raised from 0 to be consistent with the angular speed of the main shaft 816, the corresponding magnetic eddy current is produced to drive the soft iron 822 to rotate at an angular speed which is lower than that of the main shaft 816, and thus the fan fixing disc 85 is driven to rotate at a second speed.

When the small coil lead 110 and the large coil lead 112 are successively electrified, the small actuation disc 867 connected to the fastening cover 812 by the small spring piece 89 is pulled to the small friction plate 139 of the electromagnetic iron core 11 by the electromagnetic force produced by the small coil and finally attracts the small friction plate 139 relatively fixedly after semi-linkage, so that the angular speed of the magnet fixing disc is raised from 0 to be consistent with the angular speed of the driving shaft 816, and the corresponding magnetic eddy current is produced to drive the soft iron 822 to rotate at an angular speed which is lower than that of the main shaft 816; and then the large actuation disc 88 connected to the fan fixing disc 85 by the large spring piece 87 is pulled to the large friction plate 138 of the electromagnetic iron core by the electromagnetic force produced by the large coil and finally attracts the large friction plate 138 relatively fixedly after semi-linkage so as to drive the fan fixing disc to rotate at a full angular speed which is completely consistent with the angular speed of the main shaft 816, and the induced magnetic field of the soft iron 822 disappears at the moment.

A second embodiment of the electromagnetic fan clutch of the present invention will be given.

Figure 11:
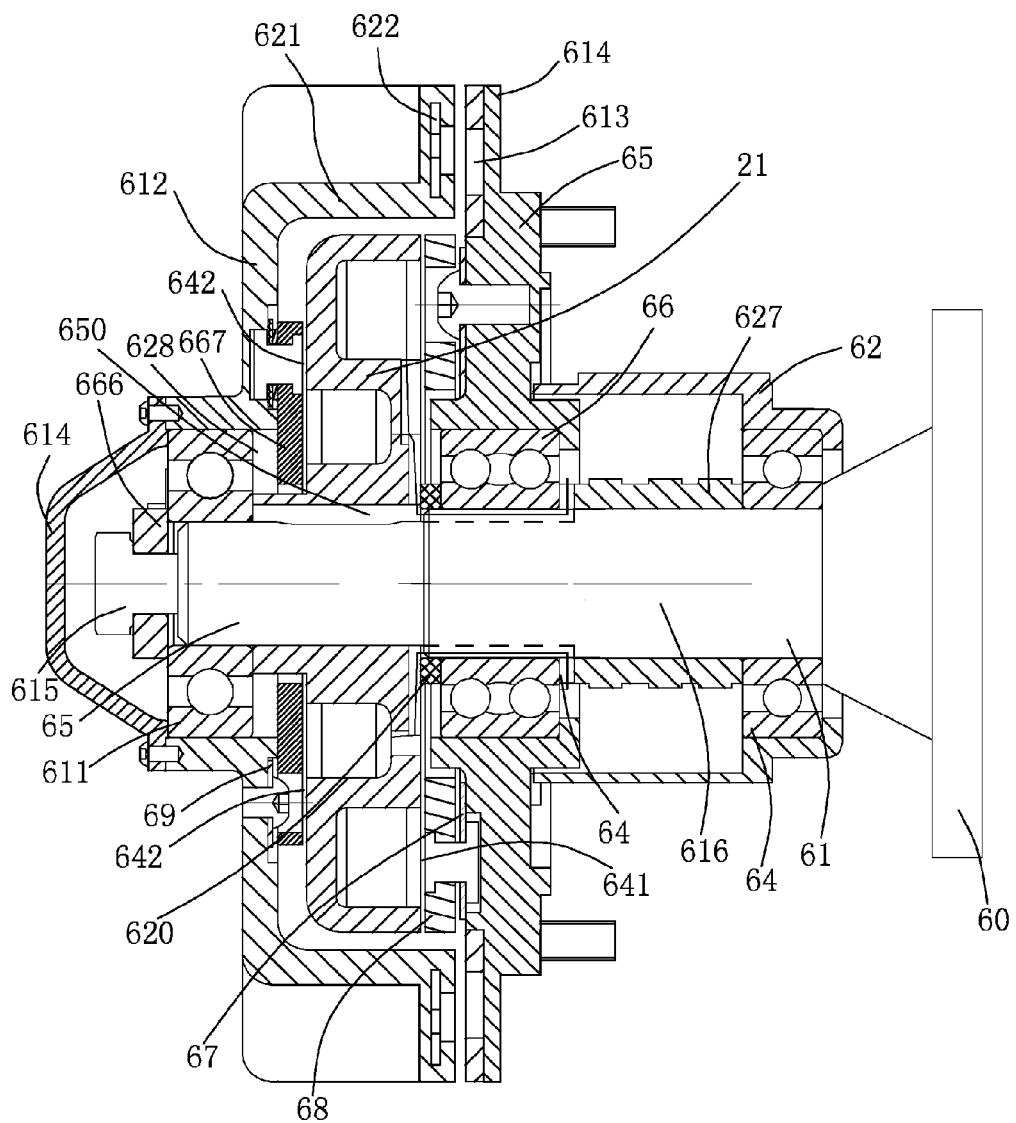
FIG. 11 is a section view of a second embodiment of an electromagnetic fan clutch of the present invention.

Refer to FIG. 11, which shows the second embodiment of the electromagnetic fan clutch of the present invention.

The electromagnetic fan clutch of the second embodiment of the present invention consists of a driving shaft 61, wherein the driving shaft 61 includes a main shaft 616 which may be hollow and a driving disc body 60, a lead slot 63 is formed in the main shaft 616, the lead slot 63 is suitable for accommodating multiple enameled wires and extends to a position close to the driving disc body 60, and a dust cover 62 and an electric brush device cover the lead slot 63. The dust cover is in tight fit to one side of the driving disc 60 of the main shaft 616 via a dust cover fixing bearing 64, and the outer ring of the dust cover fixing bearing 64 is in tight fit with the dust cover 62. A first shaft sleeve 627 made of steel 45 is arranged on the left side of the dust cover fixing bearing 64, the left side of first shaft sleeve 627 is in tight fit with a fan fixing disc bearing 66 along the main shaft 616, and the outer ring of the fan fixing disc bearing 66 is in tight fit with a fan fixing disc 65. The left side of the dust cover 62 is clamped at the right side end part of the fan fixing disc 65 and sealed. A second shaft sleeve 620 made of the steel 45 is arranged close to the left side of the fan fixing disc bearing 66 on the main shaft 616 in a tight fit manner and used for forming a first actuation gap 641. The main shaft 616 is radially shrunk on the left side of the second shaft sleeve to form a two-step platform 650, so as to further reduce the material and weight of the electromagnetic fan clutch of the present invention. A large spring piece 67 and a large actuation disc 68 are screwed to the left side of the fan fixing disc 65. The iron core through hole 24 of the electromagnetic iron core apparatus 21 of the second embodiment of the present invention is in tight fit with the main shaft 616 and sleeved with the main shaft 616 in a tight fit manner close to the left side of the second shaft sleeve 620, and thus the first actuation gap 641 is formed between the iron core through hole 24 and the large actuation disc 68. The second embodiment 21 of the electromagnetic iron core apparatus of the present invention may further be fixed on the main shaft 616 via a slot of the shaft pin sleeve 25 thereof by virtue of a pin or a flat key or a spline. The other effect of the shaft pin sleeve 25 lies in forming a second actuation gap 642, and the shaft pin sleeve 25 may also be substituted by a third shaft sleeve (not shown in the figure) made of the steel 45 to form the second actuation gap 642. An annular groove for accommodating an annular magnet fixing disc 613 is formed in the left side of the fan fixing disc 65, a plurality of disc-shaped permanent magnets for producing magnetic eddy current are embedded into the magnet fixing disc 613, the magnet fixing disc 613 and the fan fixing disc 65 integrally form a disc-shaped structure, and the right annular part forms a magnet fixing disc cover 614. A fastening cover fixing bearing 611 is arranged close to the left side of the electromagnetic iron core apparatus 21 of the second embodiment of the present invention on the main shaft 616 in a tight fit manner, and a fastening cover 612 is arranged on the outer ring of the fastening cover fixing bearing 611 in a tight fit manner. The fastening cover 612 is provided with a first annular side wall 621 sleeved on the electromagnetic iron core apparatus 21 of the second embodiment of the present invention, and an annular soft iron 622 is embedded into the top end of the first annular side wall 621 and used for producing an induced magnetic field when the magnetic eddy current is produced and driving the magnet fixing disc 613. A small spring piece 69 and a small actuation disc 667 are sequentially arranged on the inner ring of the fastening cover 612 from left to right, and the second actuation gap 642 is formed between the small actuation disc 667 and the left side of the electromagnetic iron core apparatus 21. The fastening cover fixing bearing 611 is accommodated by a fastening hole 628 of the fastening cover 612 and is in tight fit with the inner wall of the fastening hole 628, then the fastening cover fixing bearing 611 is screwed and fixed with the thread of the main shaft 616 via a fixing bolt 615 and a fastening pad 666, and each aforementioned component is compacted on the left side wall of the driving disc 60 on the main shaft 616 so as to realize overall mutual fixing. The main shaft 616 may be a hollow tubular component, and may be formed integrally with the driving disc 60 to further improve the strength of the second embodiment of the electromagnetic clutch of the present invention, further reduce the weight of the electromagnetic clutch and save materials.

The working process of the second embodiment of the electromagnetic fan clutch of the present invention is as follows.

When both the first coil leads 212 and the second coil leads 210 are not electrified, the driving disc 60 drives the main shaft 616 to rotate, and the fan fixing disc 65 freely rotates relative to the main shaft 616 due to the free sliding effects of the dust cover fixing bearing 64, the fan fixing disc bearing 66 and the fastening cover fixing bearing 611.

When the first coil leads 212 are not electrified but the second coil leads 210 are electrified, the small actuation disc 667 connected to the fastening cover 612 by the small spring piece 69 is pulled to the small friction plate 239 of the electromagnetic iron core 21 by the electromagnetic force produced by the small coils and finally attracts the small friction plate 239 relatively fixedly after semi-linkage, so that the angular speed of the magnet fixing disc is raised from 0 to be consistent with the angular speed of the main shaft 616, the corresponding magnetic eddy current is produced in the soft iron 622 to drive the magnet fixing disc 613 to rotate at an angular speed which is lower than that of the main shaft 616, and thus the fan fixing disc 65 is driven to rotate at a second speed.

When the second coil leads 210 and the first coil leads 212 are successively electrified, the small actuation disc 667 connected to the fastening cover 612 by the small spring piece 69 is pulled to the small friction plate 239 of the electromagnetic iron core 21 by the electromagnetic force produced by the small coil and finally attracts the small friction plate 239 relatively fixedly after semi-linkage, so that the angular speed of the magnet fixing disc is raised from 0 to be consistent with the angular speed of the driving shaft 616, and the corresponding magnetic eddy current is produced in the soft iron 622 to drive the magnet fixing disc 613 to rotate at an angular speed which is lower than that of the main shaft 616; and then the large actuation disc 68 connected to the fan fixing disc 65 by the large spring piece 67 is pulled to the large friction plate 238 of the electromagnetic iron core by the electromagnetic force produced by the first coils and finally attracts the large friction plate 238 relatively fixedly after semi-linkage so as to drive the fan fixing disc to rotate at a full angular speed which is completely consistent with the angular speed of the main shaft 616, and the induced magnetic field of the soft iron 622 disappears at the moment.

Other embodiments of the electromagnetic fan clutch of the present invention are omitted.

Very obviously, the aforementioned other embodiments of the electromagnetic iron core apparatus of the present invention may also directly substitute the first embodiment or the second embodiment of the electromagnetic iron core of the present invention, and are applied in the aforementioned specific embodiments of the electromagnetic fan clutch of the present invention and matched with other components and devices so as to form multiple other embodiments of the electromagnetic fan clutch of the present invention.

Those skilled in the art should understand that, various technical schemes, realized by applying the embodiments of the electromagnetic iron core apparatus of the present invention to various existing single-speed, double-speed, three-speed and more-speed electromagnetic fan clutches and transforming the components and devices matched with the embodiments of the electromagnetic iron cores of the present invention for those skilled in the art via reading the structure of the aforementioned electromagnetic fan clutch of the present invention and the working principle and conception of the electromagnetic fan clutch, should pertain to the technical schemes tried to be disclosed by the present invention.

The application and effects of the electromagnetic iron core apparatus, the manufacturing method thereof and the corresponding electromagnetic clutch of the present invention are also given.

Through each embodiment of the electromagnetic iron core apparatus of the present invention, the manufacturing materials may be saved by over 20%, and particularly, the coil material is saved by over 30%. The electromagnetic iron core apparatus is compact and simple in structure, so that each manufacturing method of each embodiment of the present invention is suitable for large-scale production, meanwhile, saves the time, reduces related procedures and particularly avoids unnecessary manual operation in the manufacturing method.

The manufacturing materials for the electromagnetic fan clutch including the electromagnetic iron core apparatus of the present invention are saved by over 30%, the size of the electromagnetic fan clutch is at least reduced to two thirds of the prior art, and particularly the size along the main shaft of the electromagnetic fan clutch may be greatly reduced, so that the electromagnetic fan clutch of the present invention is more suitable for being accommodated in various engine compartments and well matched with vehicle engines. Moreover, the size and material of each component of the electromagnetic fan clutch corresponding to the electromagnetic iron core of the present invention are correspondingly reduced by at least 30%.

The aforementioned embodiments are merely used for describing preferred implementations of the present invention, rather than limiting the scope of the present invention. Various modifications and improvements made to the technical schemes of the present invention by those of ordinary skill in the art without departing from the design spirit of the present invention shall fall into the protection scope defined by the claims of the present invention.

INDUSTRIAL APPLICABILITY

The opposed iron core apparatus, the manufacturing method thereof and the electromagnetic fan clutch including the opposed iron core of the present invention may be applied to manufacturing of various brushless and brush type electromagnetic fan clutches and manufacturing of vehicles.

What is claimed is:

1. An opposed electromagnetic iron core, comprising a first iron core groove (12 or 22) and a second iron core groove (13 or 23) axially arranged on an electromagnetic iron core body (11 or 21), the first iron core and the second iron core have opposite open directions, i.e, are arranged and distributed in an opposed manner;
    wherein an inner side wall (121) of the first iron core groove (12 or 22) is superposed with an outer side wall (122) of the second iron core groove (13) to form a common side wall; and
    an open end surface of the first iron core groove (12) and a bottom end surface (124) of the second iron core groove (13) are positioned on a same plane;
    wherein the first iron core groove (12 or 22) is a first annular groove, and the second iron core groove (13 or 23) is a second annular groove;
    wherein the opposed electromagnetic iron core further comprises friction plates (138 and 139, or 238 and 239) arranged on the first iron core groove (12 or 22) and the second iron core groove (13 or 23);
    wherein a first isometric bonding force and clamping force reinforcing corrugations (130) of which sections are semicircular are correspondingly formed on inner sides of an outer wall and a first inner wall of an open part of the first annular groove (12), and a second isometric bonding force and clamping force reinforcing corrugations (131) of which sections are semicircular are correspondingly formed on the inner sides of the outer wall and a second inner wall of an open part of the second annular groove (13).

2. The opposed electromagnetic iron core of claim 1, further comprising coils (7 and 8, or 27 and 28) arranged accommodated in the first iron core groove (12 or 22) and the second iron core groove (13 or 23).

3. The opposed electromagnetic iron core of claim 2, wherein only one wiring terminal (112, 110, 212 or 210) of each of the coils (7 and 8, or 27 and 28) is led out from a through hole (4 or 24) of the iron core body (11 or 21).

4. The opposed electromagnetic iron core of claim 3, wherein the bonding terminals (111 and 19, or 211 and 29) of the coils (7 and 8, or 27 and 28) are directly connected with the iron core body (11 or 21).

5. The opposed electromagnetic iron core of claim 4, wherein the wiring terminals (112 and 110, or 212 and 210) and the bonding terminals (111 and 19, or 211 and 29) are positioned on the same side of the iron core body (11 or 21).

6. The opposed electromagnetic iron core of claim 1, wherein a first through slot (125) is outwards formed in the bottom end surface (124) of the second annular groove (13) and provided with two openings; a first semi-through slot (126) is inwards formed at a radial opposite position of the first through slot (125) along a radial direction of the bottom end surface (124), and an opening of the first semi-through slot (126) faces an iron core through hole (4).

7. The opposed electromagnetic iron core of claim 1, wherein a first through hole (16) is formed at the radial outward farthest end of a first semi-through slot (126), a second semi-through slot (127) similar to the first semi-through slot (126) is formed in a manner that the clockwise included angle between the second semi-through slot (127) and the first semi-through slot (126) is 90° and used for counterweight and dynamic balance of the iron core body 11, the opening of the second semi-through slot (127) faces the iron core through hole (4), and a second through hole 180 is formed at the radial outward farthest end of the second semi-through slot (127).

8. The opposed electromagnetic iron core of claim 1, wherein a second through hole (180) is enlarged into a part with a sectional area before extending into the second annular groove (13), so as to form a second trapezoidal platform (133);

a fourth through hole (181) is also formed in a direction from the second through hole 180 to the iron core through hole (4) along a second semi-through slot (127);

a third semi-through slot (128) is formed outwards along the radial direction of the bottom end surface (124) in a manner that the clockwise included angle between the third semi-through slot (128) and a first through slot (125) is 90°, the opening of the third semi-through slot (128) faces the first annular groove (12), and a third through hole (129) is formed at the radial innermost end of the third semi-through slot (128);

the third through hole (129) is enlarged into a part before extending into the second annular groove (13), so as to form a first trapezoidal platform (132).

9. The opposed electromagnetic iron core of claim 7, wherein the friction plates include an annular large friction plate and an annular small friction plate, the annular large friction plate is clamped in the opening of the first annular groove (12), and the annular small friction plate is clamped in the opening of the second annular groove (13).

10. An electromagnetic fan clutch comprising the opposed electromagnetic iron core of claim 1.

11. The electromagnetic fan clutch of claim 10, wherein a first actuation gap (841 or 641) and a second actuation gap (842 or 642) are respectively formed on two sides of the opposed electromagnetic iron core apparatus (11).

12. The electromagnetic fan clutch of claim 11, comprising a main shaft (816 or 616), wherein all wiring terminals of each coil (7, 8, 27 or 28) are led out from at least one lead slot (83 or 63) of the main shaft (816 or 616).

13. The electromagnetic fan clutch of claim 12, wherein there are a plurality of lead slots (83 and 63) symmetrical to each other.

14. The electromagnetic fan clutch of claim 13, wherein a two-step platform (850 or 650) is provided on the main shaft (816 or 616).

15. The electromagnetic fan clutch of claim 14, wherein the main shaft (816 or 616) is a hollow tubular component.

16. The electromagnetic fan clutch of claim 15, comprising a driving disc (80 or 60), wherein a side of the driving disc (80 or 60) is fit with a fan fixing disc bearing (86 or 66) on the main shaft (816 or 616), an outer ring of the fan fixing disc bearing (86 or 66) is fit with a fan fixing disc (85 or 65), a second shaft sleeve (820 or 620) is arranged on the main shaft (816 or 616), a first side of the fan fixing disc (85 or 65) is connected with a spring piece (87 or 67) and an actuation disc (88 or 98), the iron core through hole (4) of the electromagnetic iron core apparatus (11) is fit with the main shaft (816 or 616), a fastening cover fixing bearing (811 or 611) is arranged close to the first side of the electromagnetic iron core apparatus (11) on the main shaft (816), a fastening cover (812 or 612) is arranged on the outer ring of the fastening cover fixing bearing (811 or 611), a spring piece (89 or 69) and an actuation disc (867 or 667) are sequentially arranged on the fastening cover (812 or 612), the fastening cover fixing bearing (811 or 611) is accommodated by a fastening hole (828 or 628) of the fastening cover (812 or 612), and a fixing bolt (815 or 615) is screwed with threads of the main shaft (816 or 616).

17. The electromagnetic fan clutch of claim 16, wherein the fan fixing disc (85) is provided with a first annular side wall (821) sleeved on the electromagnetic iron core apparatus (11), an annular soft iron (822) is embedded into an end part of the first annular side wall (821), a magnet fixing disc cover (814) is connected to the fastening cover (812), and an annular magnet fixing disc (813) is connected to the inner edge of the magnet fixing disc cover (814).

18. The electromagnetic fan clutch of claim 16, wherein the fan fixing disc (65) is provided with an annular groove for accommodating a magnet fixing disc (613), the fastening cover (612) is provided with a first annular side wall (621) sleeved on the electromagnetic iron core apparatus (21), and an annular soft iron (622) is embedded into an end part of the first annular side wall (621).

19. A method for manufacturing an opposed electromagnetic iron core comprising:

directly drawing an iron core body (11 or 21) to form a first iron core groove (12 or 22) and a second iron core groove (13 or 23);

wherein an inner side wall (121) of the first iron core groove (12) is superposed with an outer side wall (122) of the second iron core groove (13) to form a common side wall; and an open end surface of the first iron core groove (12) and a bottom end surface (124) of the second iron core groove (13) are positioned on a same plane;

wherein the first iron core groove (12 or 22) is a first annular groove, and the second iron core groove (13 or 23) is a second annular groove;

arranging coils (7 and 8, or 27 and 28);
leading only one wiring terminal of each of the coils out from an iron core through hole (4 or 24) of each iron core groove (12, 13, 22 or 23);
connecting bonding terminals of the coils with the iron core body (11 or 21);
arranging friction plates (138, 238, 139 and 239).

\* \* \* \* \*